(12) United States Patent
Doucet

(10) Patent No.: US 7,663,793 B1
(45) Date of Patent: Feb. 16, 2010

(54) WIDE ANGLE IMMERSIVE DISPLAY SYSTEM

(75) Inventor: Michel Doucet, Sainte-Foy (CA)

(73) Assignee: Institut National D'Optique, Sainte-Foy, Quebec (CA)

( * ) Notice: Subject to any disclaimer, the term of this patent is extended or adjusted under 35 U.S.C. 154(b) by 0 days.

(21) Appl. No.: 12/184,043

(22) Filed: Jul. 31, 2008

(51) Int. Cl.
*G02B 26/08* (2006.01)

(52) U.S. Cl. ............... 359/212.1; 359/204.1; 359/208.1; 359/630

(58) Field of Classification Search .................. None
See application file for complete search history.

(56) References Cited

U.S. PATENT DOCUMENTS

| | | | |
|---|---|---|---|
| 3,443,858 | A | 5/1969 | La Russa |
| 4,112,462 | A | 9/1978 | Mecklenborg |
| 4,708,438 | A | 11/1987 | LaRussa et al. |
| 5,383,052 | A * | 1/1995 | Okazaki et al. ............. 359/364 |
| 6,042,238 | A | 3/2000 | Blackham et al. |
| 6,152,739 | A | 11/2000 | Amery et al. |
| 6,563,612 | B1 | 5/2003 | Aye et al. |
| 6,814,578 | B2 | 11/2004 | Vorst |
| 6,944,581 | B2 | 9/2005 | Creek |
| 7,206,135 | B2 * | 4/2007 | Yamazaki .................. 359/630 |

OTHER PUBLICATIONS

"Infinity Display Optical Unit ("Pancake Window") Final Technical Report", Farrand Optical Company Nov. 1, 1969.
Mohon, Neil, Displays and Simulators, Applied Optics and Optical Engineering, vol. IX, 1983, pp. 203-253.
Walker, B.H., Optical design for visual systems, Tutorial texts in optical engineering, SPIE Press, 2000, p. 147.
Bossoutrot, P. et al., Visualisation de cockpit, in Technique de l'ingénieur, E4090.
Amery, J.G. and H. Streid, Flight Simulation Visual Requirements and a New Display System, www.rickleephoto.com/mosaicfresnel.htm.
Yu, K. et al., Collimating Display Screen for Simulator Displays, The interservice/Industry Training, Simulation & Education Conference, Warfighter Readiness . . . , 2001.

* cited by examiner

*Primary Examiner*—James Phan
(74) *Attorney, Agent, or Firm*—Ungaretti & Harris LLP

(57) ABSTRACT

A wide angle display system, comprising a scanner having at least one reflective surface and an axis of rotation, a dome having a reflective inner surface, the inner surface having an axis of revolution which is coincident with the axis of rotation of the scanner, at least one linear arrangement of light sources producing beams of light. The reflective surface of the scanner reflects the beams of light towards the reflective inner surface of the dome which in turn collimates the beams of light and reflects them towards an observer positioned within the wide angle display system.

21 Claims, 8 Drawing Sheets

WIDE ANGLE IMMERSIVE DISPLAY SYSTEM

TECHNICAL FIELD

The present invention relates to display systems. More specifically, the present invention relates to a wide angle immersive display system for simulators, for example flight simulators.

BACKGROUND

A simulator is a system that attempts to replicate, or simulate, a given experience by performing operations as realistically and as close as possible to the real experience for training, investigation or development purposes. A well known type of simulator is the flight simulator, which is used to train pilots. The majority of simulators require high performance display systems in order to emulate the visual environment in as realistic a manner as possible.

For some types of simulation, for example flight simulation, the visual environment generally consists in a set of objects located at great distances away from the observer. For such types of simulation, conventional display systems that produce a dynamic structured pattern of light, such as a matrix of pixel, on a surface, for example a screen, do not allow a realistic simulation of the visual environment. Such display systems allow the emulation of the visual context but the objects, i.e. the sources of light, still appear to come from short distances away. The visual context thus suggests large distances but the physiological responses of the eye reveal another reality. This is an important disadvantage since this contradictory information may alter the observer's perception or even cause illness. This problem is not present in the case of a display system using a collimated screen. Such a display system produces a collimated beam for each individual picture element, i.e. pixel, which emulates the real set of beams corresponding to a real scene consisting of distant objects.

For a realistic experience, images should extend over a wide angle of view. Thus, the observer has the impression of being immersed in the action when he or she is surrounded by the images over an important part of his viewing space.

The Head-Up Display (HUD) that equips most modern fighter aircrafts is a well known example of a collimated display. A HUD is used to project information in the nominal line of sight of the observer by means of a partially reflective or dichroic (color selective reflection) window. The HUD is a see through device since it allows the pilot to see both the outside scene and the projected information. The image projected by a HUD is a virtual image and appears to be located at far away in front of the pilot. This is accomplished with a large projection lens. The display is located close to the back focal surface of the optical system which results in the production of a virtual image located at a great distance away from the observer. The window may be either flat or curved. Conversely to the flat window, the curved window possesses an optical power and contributes to the optical power of the global optical system. The field of view of a HUD is generally small, 15-20 degrees and 30-40 degrees respectively for flat and curved window, respectively.

Collimated displays have been designed specifically for simulator purposes. There exist many types of such displays. The most simple type consists of a video display (CRT, LCD etc.) located at the focal plane of a large lens. A collimated beam with the specific propagation direction is produced for each pixel of the display. The observer is located on the other side of the lens and he or she sees the image as if it was located at an infinite distance in front of the device. Because of weight, size and cost, a conventional glass lens is generally not useable for this type of collimated display configuration. Referring to FIG. 1, such collimated display 10 generally use Fresnel lenses 12 placed between a display device 14 and the observer 1 in his or her line of sight 16. In practice, the collimating lens 12 may consist of a plurality of Fresnel lenses in order to allow an acceptable correction of the optical aberrations. The Fresnel lens virtual display approach has been used, for example, by McDonnell Douglas in the design of the Vital IV system and by Boeing.

Concave mirrors may also be used to make collimated displays. There exist at least two main optical configurations of such collimated displays, which are the on axis and the off axis configurations. Referring to FIG. 2, the on axis configuration 20 consists of a display device 22, a beam splitter 24 and a concave mirror 26. The beams of light 23 from the display device 22 is reflected on the beam splitter 24 and reflected towards the concave mirror 26. The concave mirror 26 then reflects and collimates the beams of light 27 back through the beam splitter 24 towards the observer 1. In general, the beam splitter 24 is simply a partial reflectivity flat window and has no optical power. The beam splitter 24 acts as a folding mirror for the object space part of the optical path and as a window for the rest of the path. For the object space part of the optical path, the display system is equivalent to having the display device 22 located directly in front of the concave mirror 26 at the position corresponding to the virtual image 25 formed by the beam splitter 24. On the other hand, the off axis mirror configuration 30, shown in FIG. 3, uses an off axis portion 31 of a concave mirror 32 to reflect beams of light 35 from a display device 34 towards the observer 1 and achieve the same goal of producing a distant virtual image without requiring the use of a beam splitter. The off axis configuration 30 is much more energy efficient in comparison to its on axis counterpart 20.

There exists a variant of the concave mirror configurations 20, 30 commercialized under the name Pancake Window™ by Farrand Optical Company. The Pancake Window™ optical system 40, illustrated in FIG. 4, uses a partially reflective concave mirror 42 together with a flat beam splitter 44 and different types of polarizing components 46 (quarter-wave plates 46a and linear polarizers 46b). The polarizing components 46 are used to eliminate undesirable ghost images and reflections. The polarizing components 46 have the shape of thin flat sheets having their normal axis coincident with the optical axis 41 of the optical system 40. The beam splitter 44 also has its normal coincident with the optical axis 41 of the optical system 40. The display device 48 is located behind the concave mirror 42. In the object space path 49, the beams of light 47 from the display device 48 pass through the concave mirror 42 and are reflected back toward the concave mirror 42 by the beam splitter 44. The beams of light 47 are then reflected by the concave mirror 42 and pass through the beam splitter 44. Most of the beams of light 47 with optical paths different than the nominal path 45 are eliminated by the polarizing components 46. In an alternative version, the concave mirror 42 may be replaced by a holographic element with similar optical properties. The optical system 40 is relatively compact and provides a relatively large field of view (60 degrees by 90 degrees) but it is not energy efficient. It has a transmission of only about 1%. This is an important drawback since this imposes a limitation on the image brightness.

Collimated displays have also been made using only holographic elements, as shown in FIG. 5. Such collimated display 50 consists of a holographic diffusing screen 52 with a holographic lens 54. The image to be displayed is projected by a projector 56 on the holographic diffusing screen 52. The holographic diffusing screen 52 is used to control the light divergence to ensure that each image pixel produces a cone of light which illuminates the entire surface of the holographic lens 54. The intermediary image 53 on the holographic diffusing screen 52 is located on the front focal plane of the holographic lens 54. The holographic lens 54 produces a virtual copy of the image at an infinite distance. Hence, a large collimated beam is produced for each pixel of the input image.

The above-presented collimated displays do not have large enough field of view to provide an immersive sensation. Larger field of view may be achieved by producing a mosaic of several Pancake Windows™, Fresnel lens virtual displays, holographic collimated displays or others single channel collimated displays. Very large field of view may be achieved with the mosaic approach at the expense of the complexity related to the calibration required to obtain uniform properties and the necessity to drive all of those displays simultaneously. In addition to the complexity, another drawback of the mosaic approach is the fact that it does not provide a truly continuous image since there are dead zones in between adjacent displays.

Continuous displays with a medium field of view may be made using an off axis mirror with a plurality of display devices. In comparison with the single channel off axis mirror display, the field of view increase is generally achieved for only the horizontal direction. For some of those systems, the images are produced with video projector and projected on a curved (with aspheric shape) screen which acts as a secondary image. The light diffused from the screen is then reflected and collimated by the off axis mirror. Such devices are generally used for commercial airplane flight simulators and vehicle simulators.

The realization of a wide angle display is challenging as such a device must produce a large number of collimated beams coming from a very large range of directions and, using conventional approaches as described above, involves large optical components.

In the present specification, there are described embodiments of a wide angle display system designed to overcome the above-described limitations of the conventional display systems.

SUMMARY

The present invention relates to a wide angle display system, comprising:
- a scanner having at least one reflective surface and an axis of rotation;
- a dome having a reflective inner surface, the inner surface having an axis of revolution which is coincident with the axis of rotation of the scanner;
- at least one linear arrangement of light sources producing beams of light; and
- wherein the reflective surface of the scanner reflects the beams of light towards the reflective inner surface of the dome which in turn collimates the beams of light and reflects them towards an observer positioned within the wide angle display system.

BRIEF DESCRIPTION OF THE FIGURES

A non-limitative illustrative embodiment of the invention will now be described by way of example only with reference to the accompanying drawings, in which.

DETAILED DESCRIPTION

Generally stated, the non-limitative illustrative embodiment of the present invention provides a wide angle immersive display system for applications requiring both a wide field of view and collimated display capabilities. Flight simulators and other types of training simulator (ship, motor bike, car, etc,) are examples of such applications but many other display applications may take advantage of the present invention, such as, for example, the display of information in vehicles or the cockpit of an airplane or even video games.

As mentioned previously, the realization of a wide angle display is challenging as such a device must produce a large number of collimated beams coming from a very large range of directions and, using conventional approaches, involves large optical components. The present invention discloses a scanning process which allows the realization of a compact wide angle display, having collimated display capabilities, with relatively small optical components.

Figure 1:
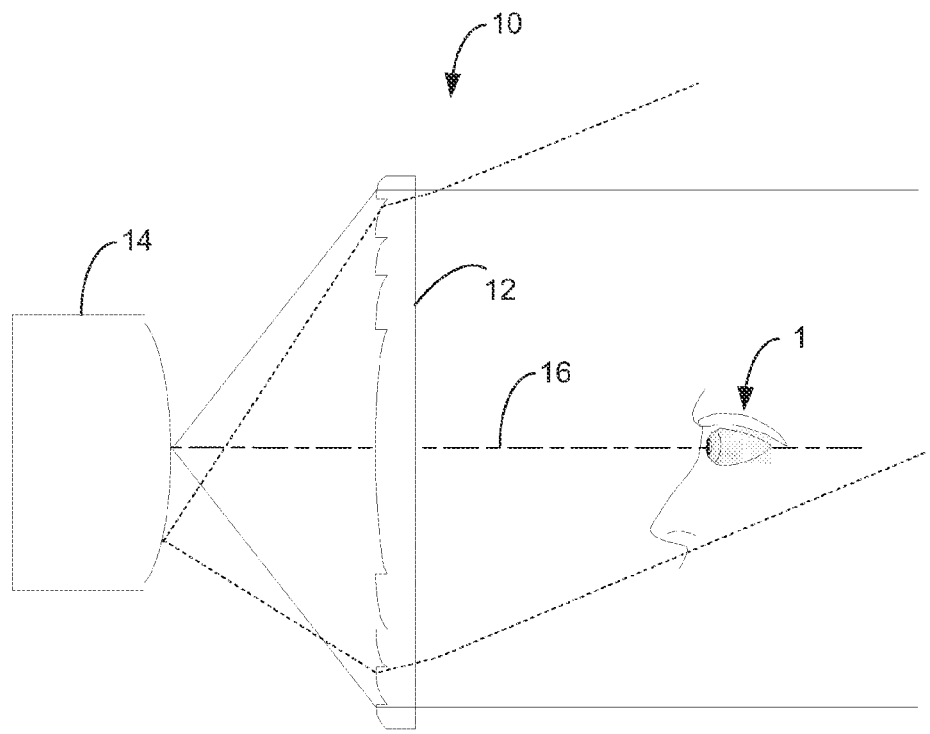
FIG. 1 is schematic view of a prior art collimated display using Fresnel lenses.
Figure 2:
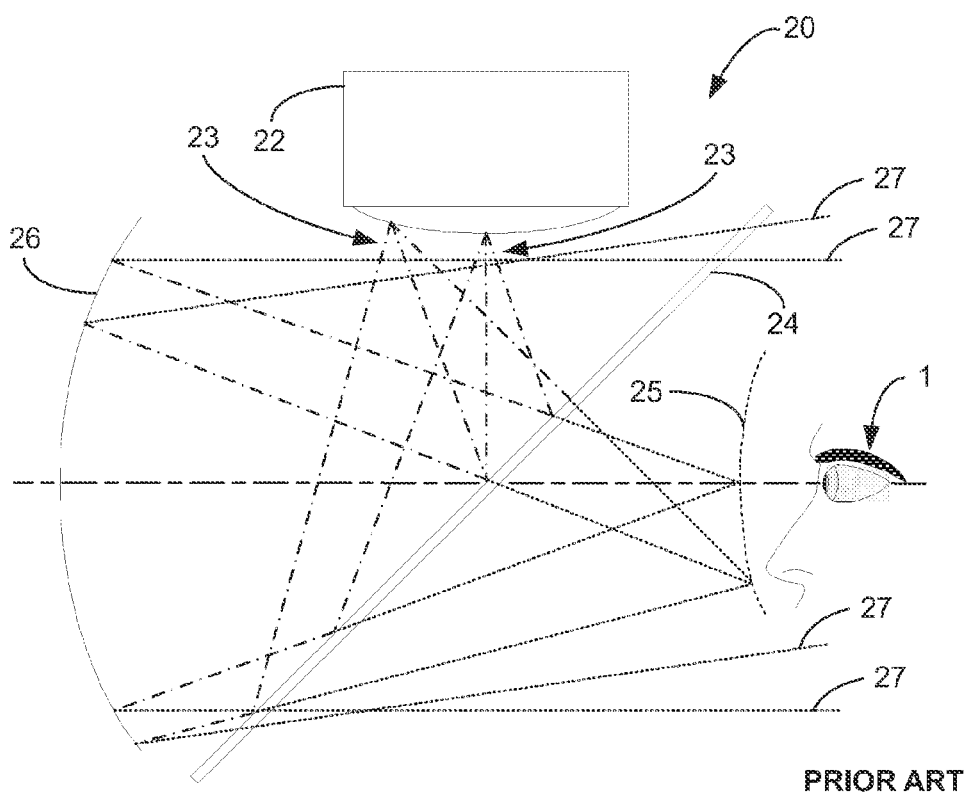
FIG. 2 is schematic view of a prior art collimated display using a concave mirror in an on axis configuration.
Figure 3:
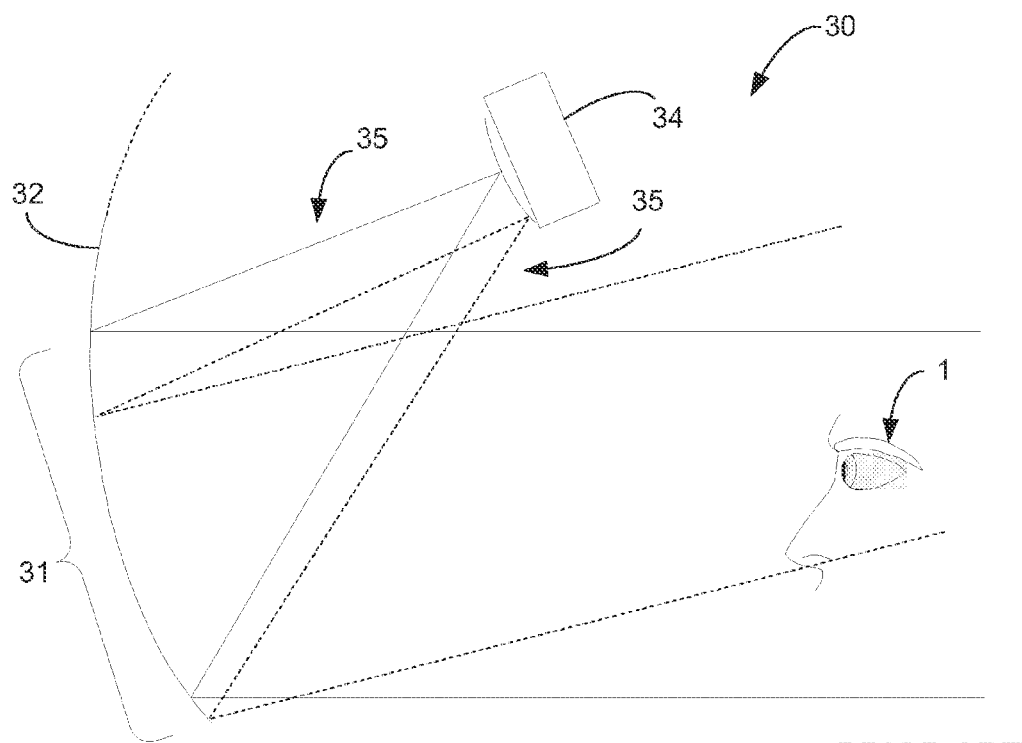
FIG. 3 is schematic view of a prior art collimated display using a concave mirror in an off axis configuration.
Figure 4:
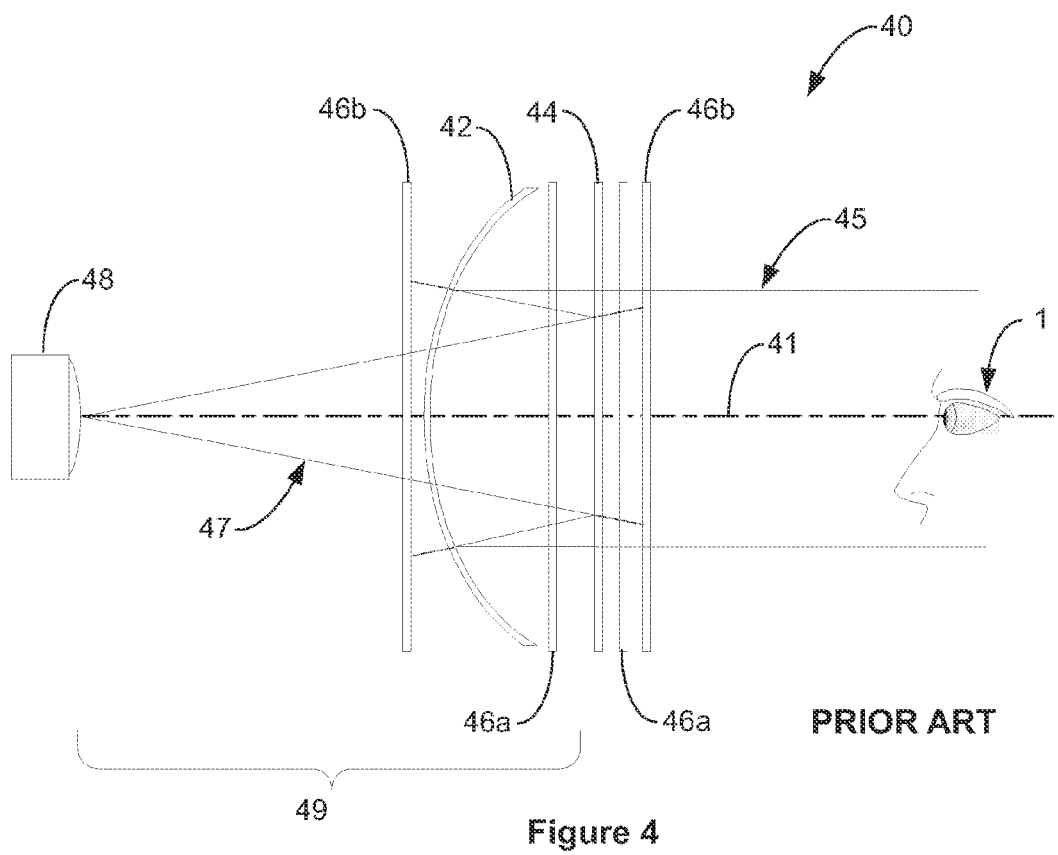
FIG. 4 is schematic view of a prior art collimated display using a concave mirror in an Pancake Window™ configuration.
Figure 5:
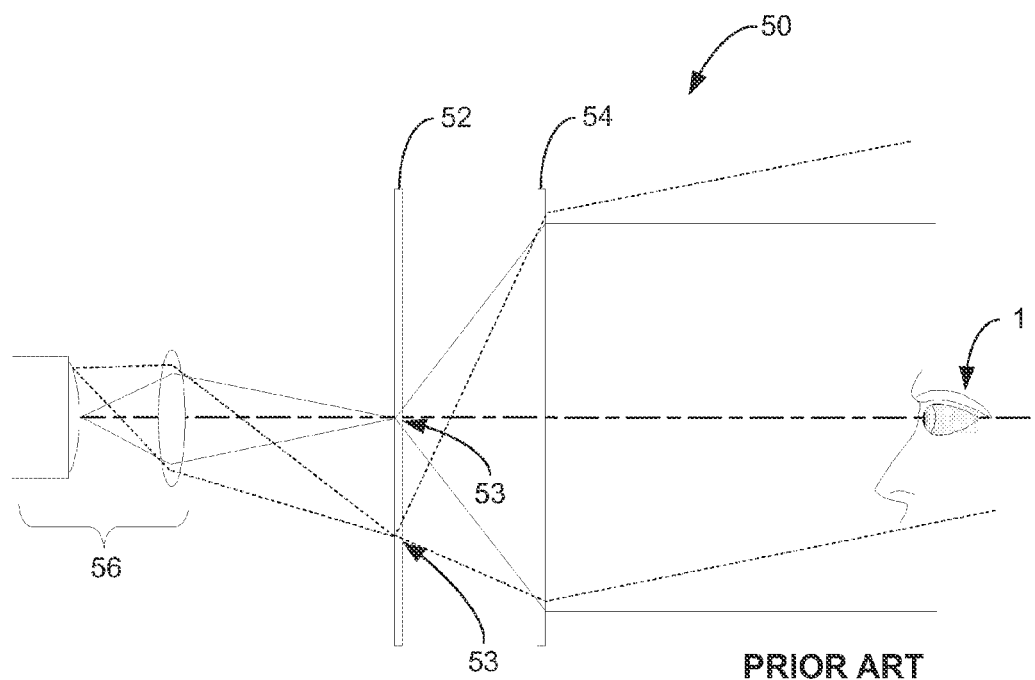
FIG. 5 is schematic view of a prior art collimated display using holographic elements.
Figure 6:
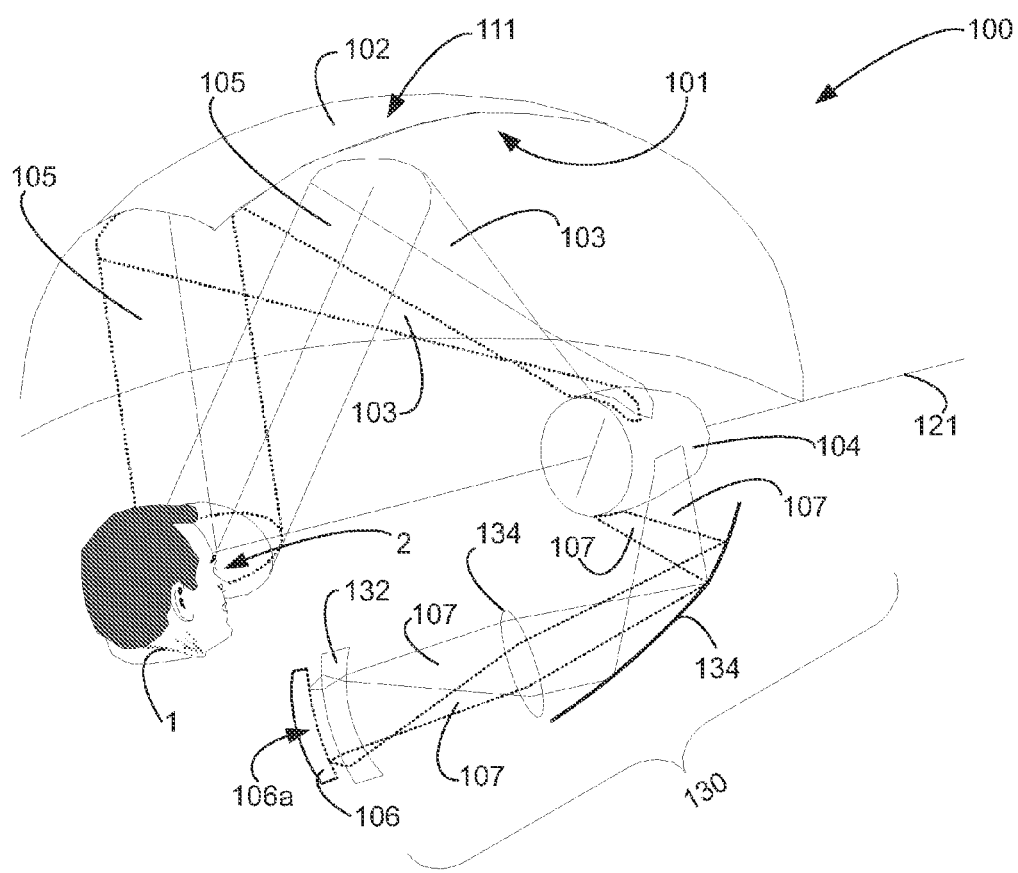
FIG. 6 is a schematic perspective view of the wide angle immersive display system according to the illustrative embodiment of the present invention.

Referring to FIG. 6, the main components of the wide angle immersive display system 100 are a dome 102 having a reflective inner surface 101 forming an optical mirror surrounding an observer 1, a scanner 104 and at least one linear array of pixels (LAP) 106. A LAP 106 generates dynamic images consisting of a line of luminous pixels from a linear arrangement of light sources 106a such as, for example, a line of LEDs or an illuminated line of deformable or reclining micromirrors. The beams of light 107 produced by each LAP 106 are transformed by a shaping module 130 and directed toward the scanner 104, which produces scanned beams of light 103 that are then reflected toward the observer 1 by the inner surface 101 of the dome 102. The final result of the transformation chain of the beams of light is a collimated beams of light 105 pointing toward the eyes 2 of the observer 1 for each image pixel generated by each LAP 106.

The shaping module 130 that makes the link between each LAP 106 and the scanner 104 consist of a set of optical components that take the beams of light 107 from the LAP 106 and aim them toward the scanner 104. Each individual beam associated with each pixel 106a of the LAP 106 is transformed by the shaping module 130 in order to give it appropriate divergence (or convergence) and main direction properties before reaching the scanner 104.

Figure 7:
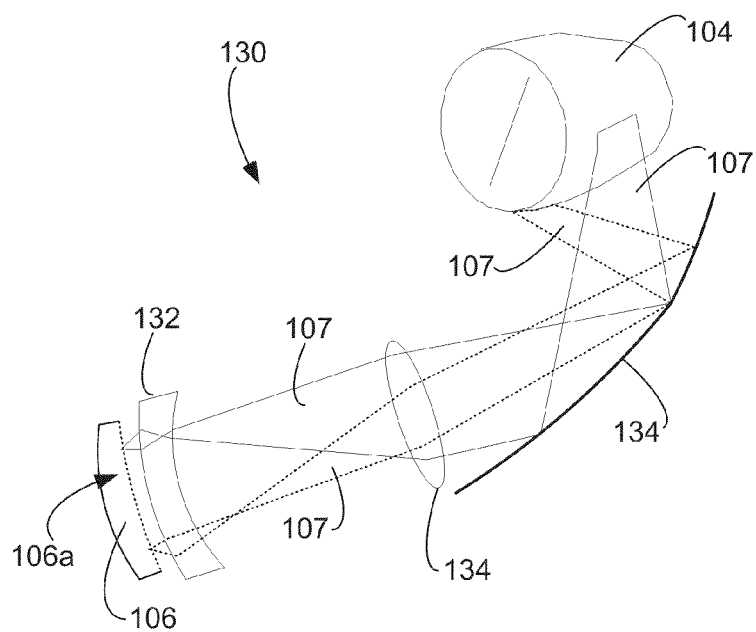
FIG. 7 is a schematic view of an example of a shaping module for use with the wide angle immersive display system of FIG. 6.

Referring to FIG. 7, there is shown an example of a generic configuration for the shaping module 130. The shaping module 130 consists of a converter 132 and a collecting group 134. The collecting group 134 transforms the individual beams of light 107 to feed the scanner 104 with beams having appropriate direction, divergence and wavefront characteristics. The purpose of the converter 132 is to match the numerical aperture (a measure of the divergence of a beam of light) characteristics of the beams of light produced by individual pixels of the LAP 106 with those required for the rest of the optical train. Moreover, the converter 132 redirects the individual beams of light 107 toward the collecting group. The converter 132 may include refractive and reflective components, diffusing and diffractive elements, optic fibers, fiber optics faceplate or an array of micro components (one for each pixel 106a for example). It will be apparent to a person skilled in the art that other configurations may be considered for the shaping module 130.

Figure 8:
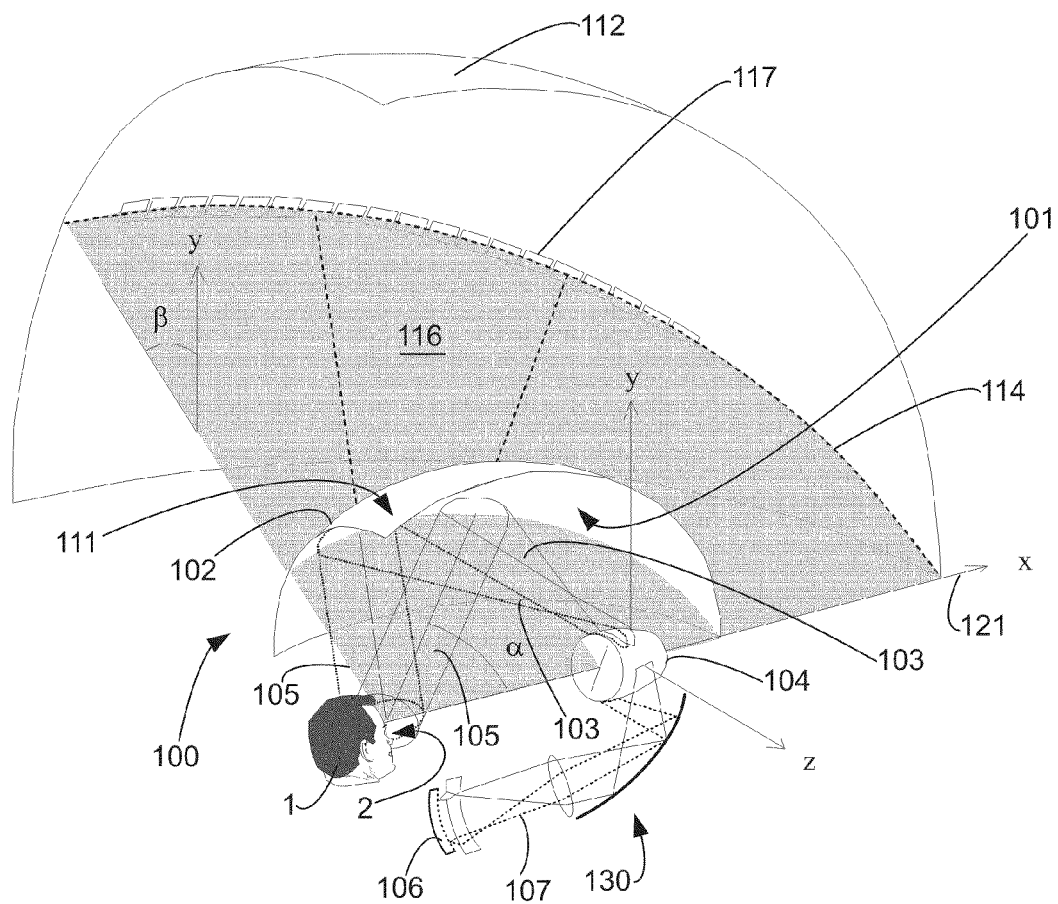
FIG. 8 is a schematic perspective view of the wide angle immersive display system of FIG. 6 on which is superimposed a system of coordinates.

Referring now to FIG. 8, at each rotational position of the scanner 104, only a 1-D series of pixels is displayed by each LAP 106 and appears to the observer 1 as if coming from a portion of a meridian 114 located on a virtual spherical screen 112 with infinite radius and centered on the observer 1. Selecting another rotational position of the scanner 104 changes the direction of the scanned beams of light 103 and the system 100 generates the collimated beams of light 105 appearing to come from a 1-D series of pixels located on another meridian on the virtual spherical screen 112. The synchronous addressing of the LAP 106 with the rotation of the scanner 104 allows the generation of 2D images appearing to come from an infinite radius virtual spherical screen 112.

To ensure the invariance of the optical properties with respect to the rotational position of the scanner 104, the reflective inner surface 101 of the dome 102 is advantageously a symmetrical surface having an axis of revolution 121 which is coincident with the axis of rotation of the scanner 104. Moreover, the nominal position of the eyes 2 of the observer 1 is also advantageously located on the axis of revolution 121 of the dome 102. In that configuration, the 1-D series of pixels 117 associated with each LAP 106, and a specific rotational position of the scanner 104, appears to the observer 1 as if located on a portion of a meridian 114 on an infinite size virtual spherical screen 112. The collimated beams of light 105 for a specific rotational position are all parallel to the meridian plane 116 containing the axis of revolution 121 of the dome 102 and the associated meridian 114. The meridian plane 116 and the collimated beams of light 105 rotate around the axis of revolution 121 two time faster than the scanner 104.

The combination of the rotating scanner 104 with reflection of the scanned beams of light 103 on the reflective inner surface 101 of the dome 102 allows for the generation of a large number of collimated beams of light 105 projected toward the eyes 2 of the observer 1 from a wide range of directions, thus realizing a wide angle immersive display. The wide angle immersive display system 100 has the potential to be compact due to the scanning approach. The generation of the collimated beams of light 105 over a wide range of directions all around the observer 1 without scanning would requires optical components all around the observer 1. The part of the optical train preceding the scanner 104 deals only with 1-D images. This liberates space and thus permits the folding of the optical train and makes thus the system 100 more compact.

The profile of the reflective inner surface 101 of the dome 102, e.g. the curve corresponding to the intersection of the inner surface 101 of the dome 102 with a plane containing the axis of revolution 121 of the dome 102, should be chosen such as to perform both the deviation of the collimated beams of light 105 towards the eyes 2 of the observer 1 and, in collaboration with the other optical components, the collimation of the scanned beams of light 103 for each pixel 106a. An elliptical or an elliptical like profile is advantageous since all scanned beams of light 103 passing through one focal point of an ellipsoidal (ellipse of revolution) mirror are reflected toward the other focal point. For an ellipsoidal reflective inner surface 101, the foci are both located on the axis of revolution 121 and the scanner 104 would be centered around one of the foci while the eyes 2 of the observer 1 would be located around the other focal point. Other shapes for the reflective inner surface 101 may be considered, for example parabola, free form, etc.

The curvature of the reflective inner surface 101 of the dome 102 differ according to direction. This geometrical anisotropy translates into anisotropic optical properties such as the optical power. A set of rays from the collimated beams of light 105 contained in a given meridian plane will be focalized by the inner reflective surface 101 at a distance different from its counterpart for rays contained in a plane perpendicular to this meridian plane.

Figure 9:
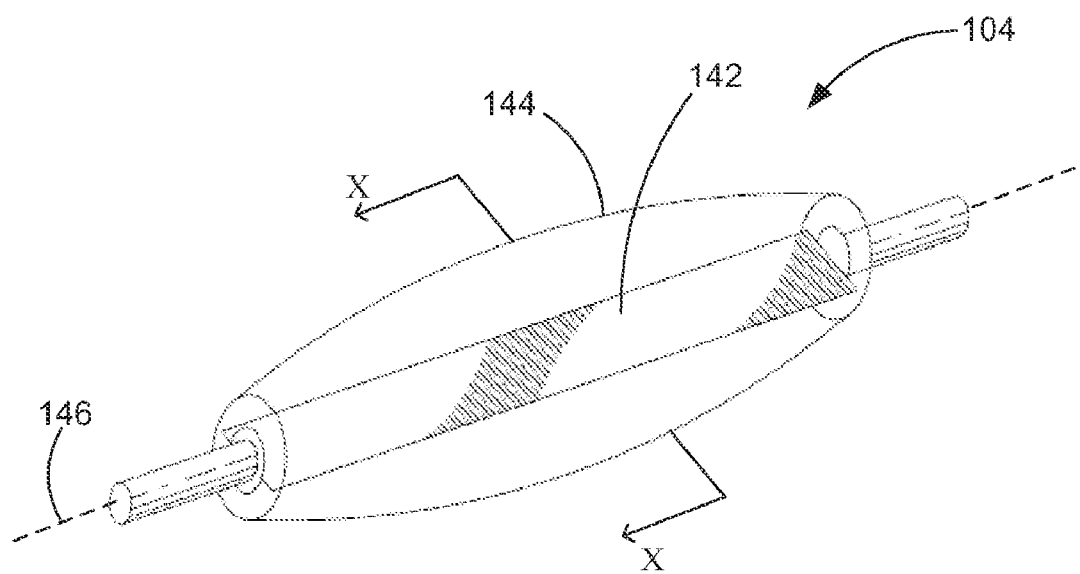
FIG. 9 is a perspective view of a scanner with a profiled transparent body.

Referring to FIG. 9, a possible way to address this issue is to encapsulate the reflective inner surface 142 of the scanner 104 within a profiled transparent body 144, for example a profiled solid cylinder, having a symmetry of revolution about the scanner's 104 rotation axis 146. In this case, the reflective inner surface 142 may be a thin layer of reflective material such as, for example, a thin metal coating, embedded within the transparent body 144 produced by, for example, gluing two separate pieces together. This profiled transparent body 144 acts as a cylindrical lens and allows a partial compensation for the directional optical power anisotropy of the reflective inner surface 142 of the dome 102 (see FIG. 8). For a scanner 104 such as illustrated in FIG. 9, the scanning is done by rotating the transparent body 144 itself about its cylindrical (or symmetry) axis 146.

Figure 10A:
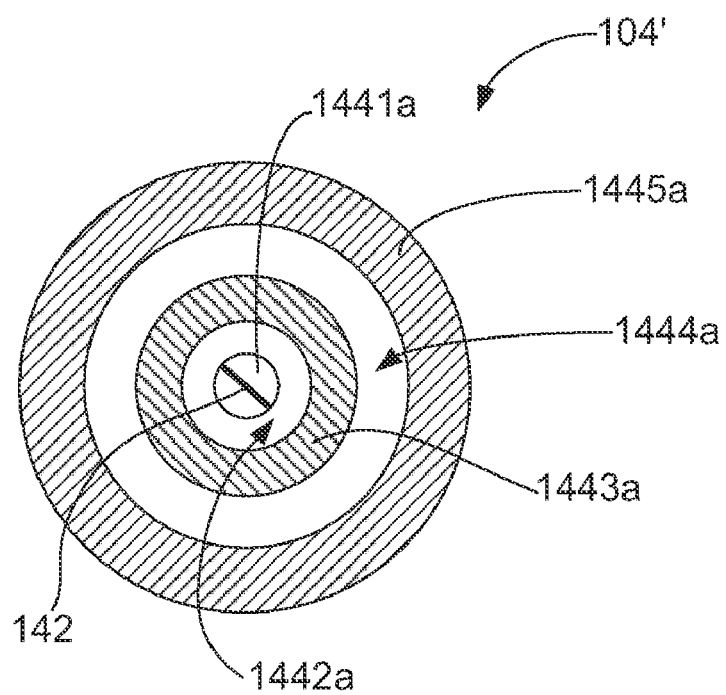
FIGS. 10A and 10B are illustrative examples of cross-sectional views of the scanner along axis X-X in FIG. 9.
Figure 10B:
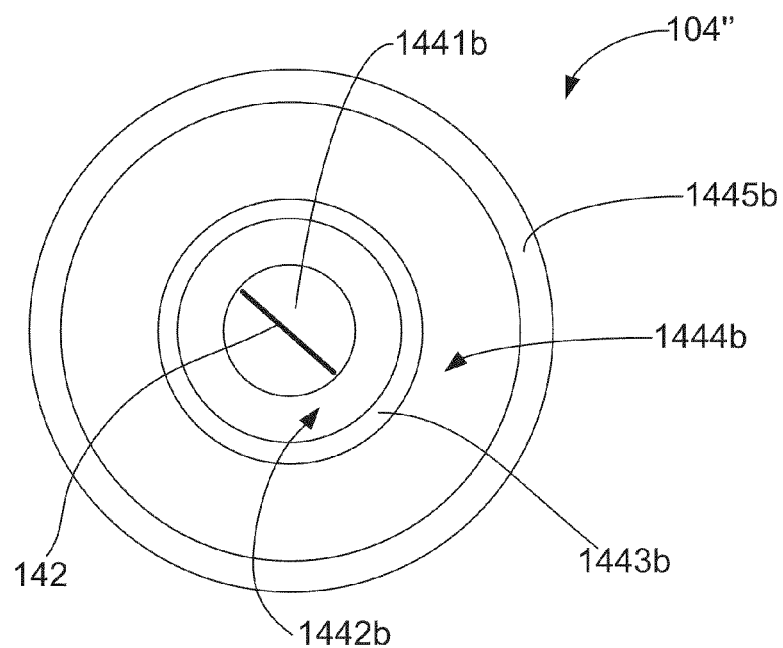

Toric layers made of, for example, different type of glasses or plastics, may be added to the transparent body 144 in a concentric configuration to improve the control of aberrations. Transparent bodies 144 with radial (or other) distribution of the index of refraction may also be considered. For example, referring to FIGS. 10A and 10B, there are shown cross sections of alternative embodiments of scanners 104', 104" having a series of layers each having an associated thickness and/or refraction index, namely core shells 1441a, 1441b within which is embedded the reflective inner surface 142, internal shells 1443a, 1443b and external shells 1445a, 1445b, the various shells being separated by respective air gaps 1442a, 1444a and 1442b, 1444b. It is to be understood that the number of layers as well as the thickness and refraction index of each layer may vary according to the desired correction. Furthermore, the exterior and/or interior surfaces of the various layers composing the scanners 104', 104" may be sculpted or profiled so as to provide specific corrections. It is further to be understood that the various layers may form imbricate tubes whose thickness varies longitudinally.

Referring back to FIG. 8, for a small longitudinal angular field of view (defined by angle ☐), the shaping module(s) 130 can be placed inside of the dome 102. However, the shaping module(s) 130 may occlude rays in the case of larger fields of view. In that case, all the optics, except the scanner 104, may be placed outside of the dome 102. The beams of light 107 produced by the LAP(s) 106, which are transformed by the shaping module(s) 130, may be introduced in the system 100 by passing through the dome 102. The inner surface 101 of the dome 102 can be made partially reflective (and thus partially transmissive) to allow the transmission of the light through its shell.

The dome 102 can be made, for example, of a transparent material with an outside surface 111 covered with absorbing material except at the input ports (places on the dome 102 where the beams of light 107 are introduced). It can also be made of a plurality of sections made of different types of material. The outside surface of the input ports may be shaped to deviate the beams or for aberration correction purposes. The approach of placing the optics outside the dome 102 allows displaying over a 360° longitudinal angular field of view about the axis of revolution 121 of the dome 102 since the shaping module(s) 130 are positioned all around the scanner 104 in such a way as to not cause any obscuration.

The difficulties encountered in the correction of the aberrations increase with the angular field of view. A multi-dome approach may be envisioned to improve the optical performances according to the latitudinal angular field of view (defined by angle ☐ in FIG. 8) by distributing the large field of view over a plurality of smaller fields.

Figure 11:
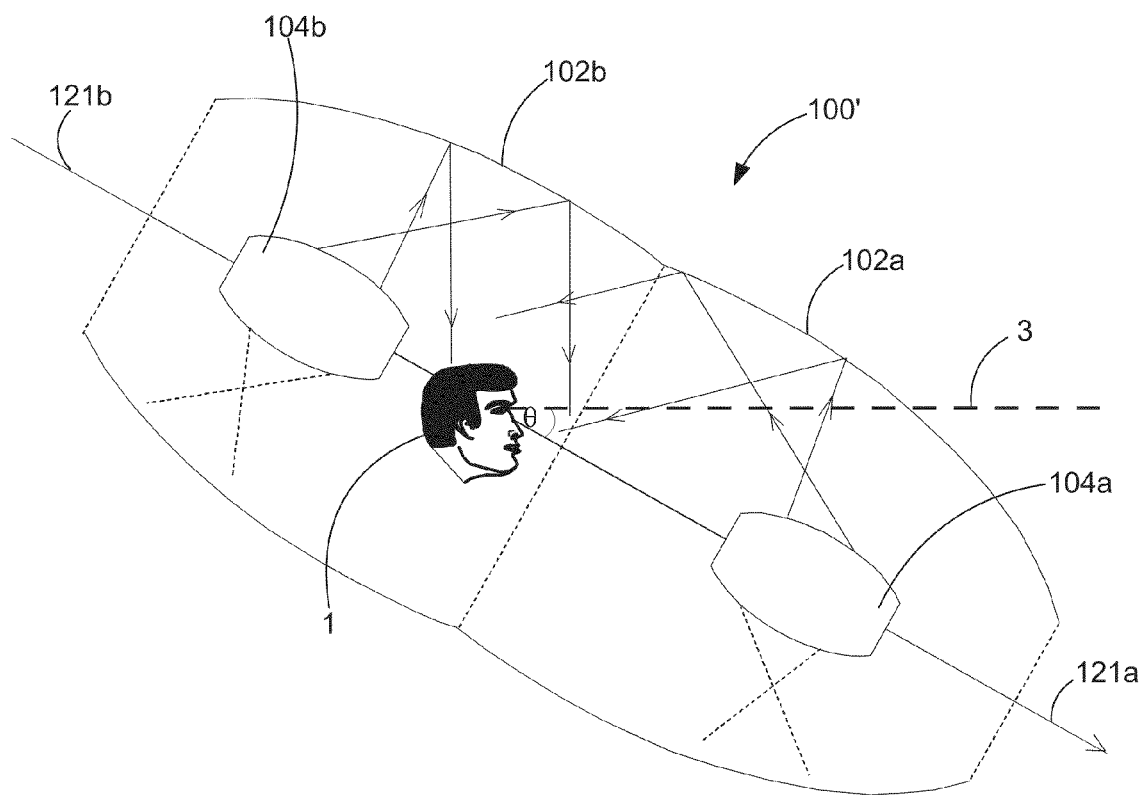
FIG. 11 is a schematic view of a first alternative embodiment of the wide angle immersive display system including two domes.

Referring to FIG. 11, There is shown an example of a system 100' having a configuration that includes two domes 102a and 102b. In this example, the front dome 102a covers the latitudinal angular field of view from 10° to 50° while the back dome 102b covers the 50° to 100° part of the latitudinal angular field of view. As it may be observed, the axis of revolution 121b of the second dome 102b is coincident with the axis of revolution 121a of the first dome 102a. Moreover, in this example, the common axes of revolution 121a and 121b are tilted by an angle ☐ with respect to the nominal sight direction 3 of the observer 1 so as to increase forward visibility, i.e. to lessen the forward obscuration caused by the scanner 104a. It is to be understood that this feature can also be used in the case of the single dome configuration.

Difficulties encountered in the correction of aberrations can also be reduced by splitting the latitudinal angular field of view over a plurality of LAPs 106 and associated shaping modules 130.

Referring back to FIG. 8, in the particular case of a system 100 with a single shaping module 130, adjacent beams of light 107 generally overlap on the various optical surfaces. To avoid this, a configuration using multiple shaping modules 130 sharing the latitudinal angular field of view may be used, each shaping module 130 being shifted both along and angularly around the axis of revolution 121 of the dome 102 with respect to its predecessor.

Figure 12:
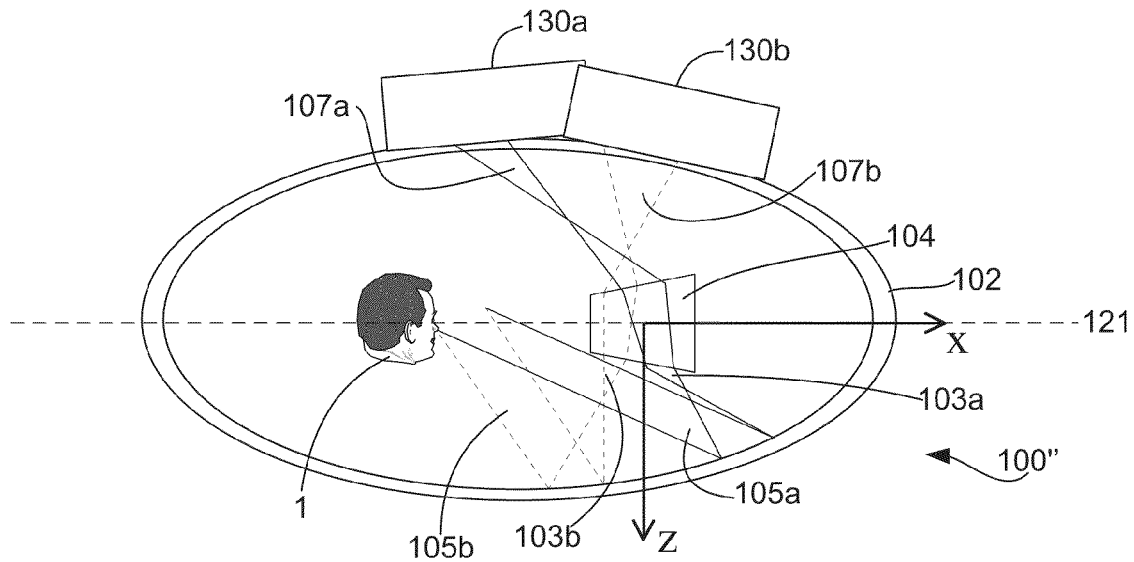
FIG. 12 is a first schematic view of a second alternative embodiment of the wide angle immersive display system including two shaping modules, which are shown shifted along the revolution axis of the dome.
Figure 13:
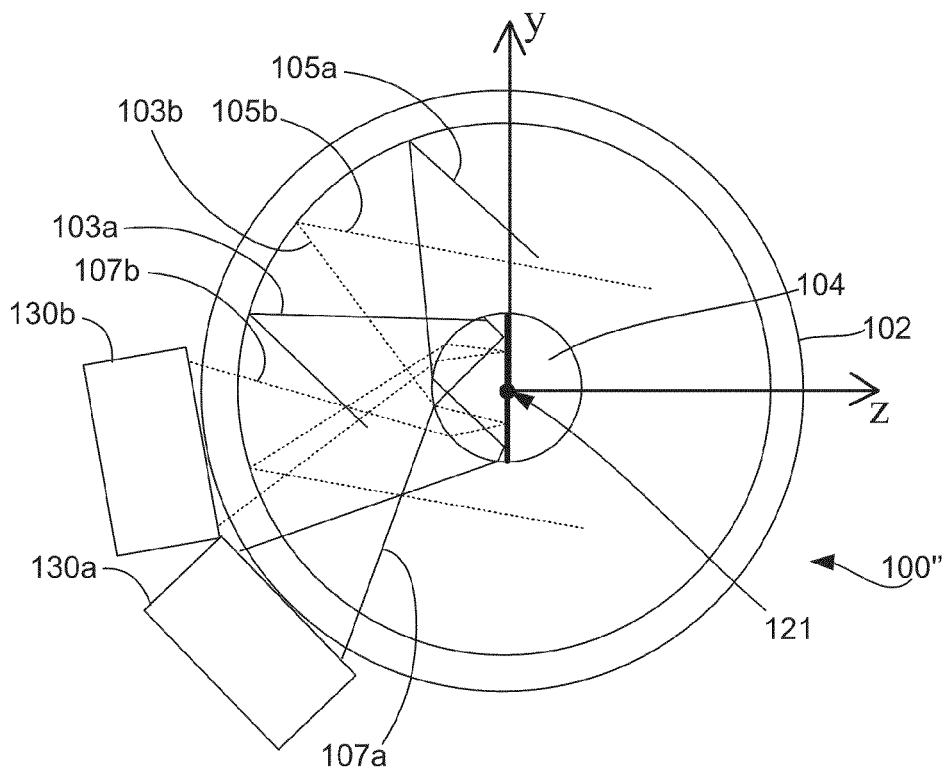
FIG. 13 is a second schematic view of the second alternative embodiment of the wide angle immersive display system of FIG. 13 where the two shaping modules are shown shifted angularly around the revolution axis of the dome.

FIGS. 12 and 13 show an example of a system 100" having a configuration that includes two shaping modules 130a and 130b which are both shifted along (FIG. 12) and angularly around (FIG. 13) the axis of revolution 121 of the dome 102. The shaping modules 130a and 130b provide respective plurality of beams of light such as beams of light 107a and 107b to scanner 104, which produces scanned beams of light 103a and 103b that are then reflected toward the observer 1 as collimated beams of light 105a and 105b by the inner surface 101 of the dome 102.

Figure 14:
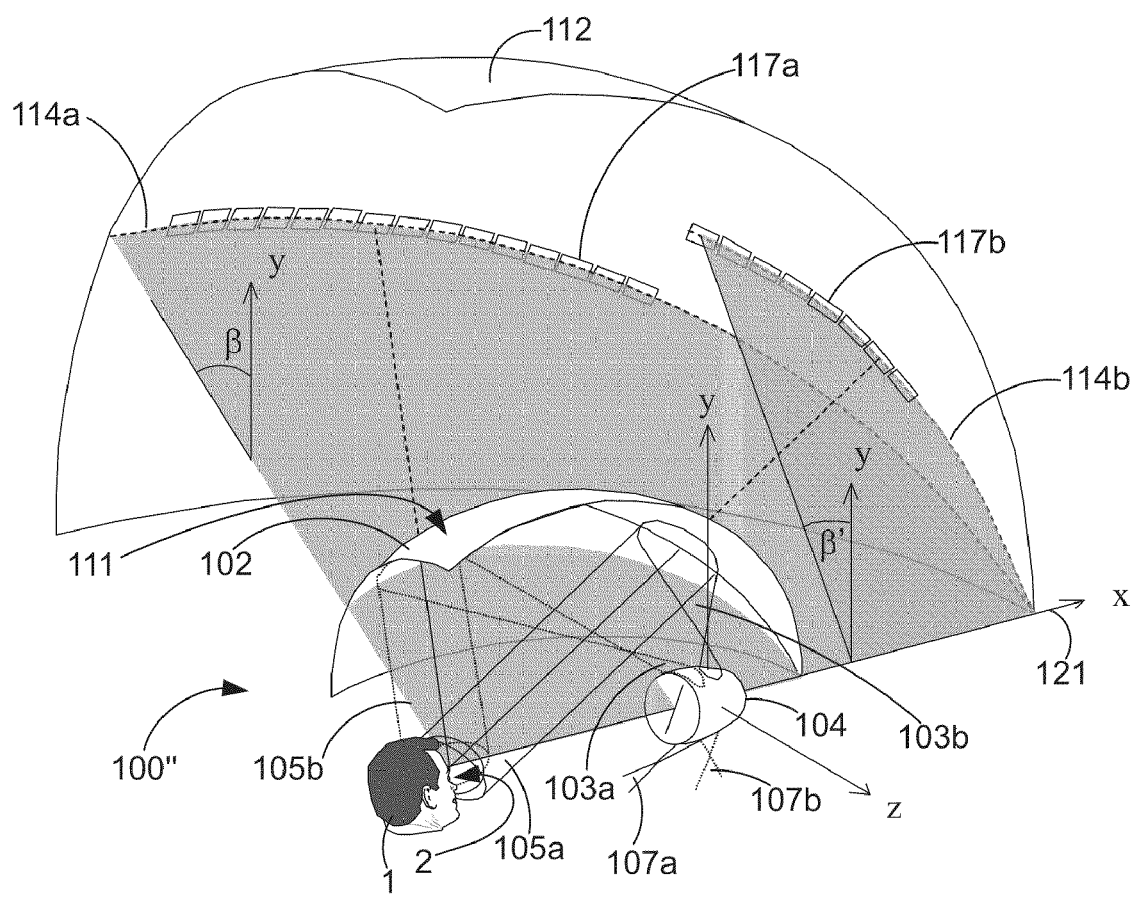
FIG. 14 is a schematic perspective view of the second alternative embodiment of the wide angle immersive display system shown in FIGS. 12 and 13.

Referring now to FIG. 14, the resulting image from the collimated beams of light 105a and 105b is displayed as a 1-D series of pixels 117a and 117b appearing on respective angularly shifted meridians 114a and 114b on the infinite size virtual spherical screen 112. The entire set of shaping modules 130a and 130b, with their associated LAP (not shown) may be replicated around the axis of revolution 121 of the dome 102 to increase the longitudinal angular field of view.

Although the present invention has been described by way of particular embodiments and examples thereof, it should be noted that it will be apparent to persons skilled in the art that modifications may be applied to the present particular embodiment without departing from the scope of the present invention.

What is claimed is:

1. A wide angle display system, comprising:
   a scanner having at least one reflective surface and an axis of rotation;
   a dome having a reflective inner surface, the inner surface having an axis of revolution which is coincident with the axis of rotation of the scanner;
   at least one linear arrangement of light sources producing beams of light; and
   wherein the reflective surface of the scanner reflects the beams of light towards the reflective inner surface of the dome which in turn collimates the beams of light and reflects them towards an observer positioned within the wide angle display system.

2. A wide angle display system according to claim 1, whereby in use the synchronous addressing of the linear arrangement of light sources with the rotation of the scanner allows the generation of images appearing to come from an infinite radius screen.

3. A wide angle display system according to claim 1, further comprising a shaping module associated with each of the at least one linear arrangement of light sources for aiming the beams of light at the reflective surface of the scanner.

4. A wide angle display system according to claim 3, wherein the shaping modules are shifted along and angularly around the axis of revolution of the dome.

5. A wide angle display system according to claim 3, wherein the shaping module includes:
   a collecting group for transforming characteristics of the beams of light; and
   a converter for adjusting the divergence of the beams of light and redirecting the beams of light from the linear arrangement of light sources towards the collecting group.

6. A wide angle display system according to claim 4, wherein the characteristics include direction, divergence and wavefront.

7. A wide angle display system according to claim 4, wherein the converter includes at least one element selected from a group consisting of a refractive component, a reflective component, a diffusing element, a diffractive element, optic fibers, fiber optics faceplate and an array of micro components.

8. A wide angle display system according to claim 3, wherein each shaping module is located inside the dome.

9. A wide angle display system according to claim 3, wherein each shaping module is located outside the dome.

10. A wide angle display system according to claim 9, wherein the dome includes input ports associated with each shaping module for introducing the beams of light inside the dome.

11. A wide angle display system according to claim 10, wherein an outside surface of the input ports is shaped so as to deviate the beams of light.

12. A wide angle display system according to claim 10, wherein an outside surface of the input ports is shaped so as to correct aberrations in the beams of light.

13. A wide angle display system according to claim 1, wherein the reflective inner surface is symmetrical about the axis of revolution of the dome.

14. A wide angle display system according to claim 1, wherein the reflective inner surface has an ellipsoidal profile having a first and second focal points and wherein the scanner is positioned at a first focal point and the observer is positioned at the second focal point.

15. A wide angle display system according to claim 1, wherein the at least one reflective surface of the scanner is encapsulated within a profiled transparent body.

16. A wide angle display system according to claim 15, wherein the profiled transparent body is generally cylindrical in shape about the axis of revolution of the dome.

17. A wide angle display system according to claim 15, wherein the profiled transparent body includes a plurality of layers having different refraction indexes.

18. A wide angle display system according to claim 17, wherein at least one of an inner or outer surface of one of the layers is profiled so as to provide a desired optical correction.

19. A wide angle display system according to claim 1, wherein the at least one linear arrangement of light sources includes a line of elements selected from a group consisting of LEDs and illuminated micro-mirrors.

20. A wide angle display system according to claim 1, wherein the axis of revolution of the dome is tilted with respect to the nominal sight direction of the observer.

21. A wide angle display system according to claim 1, further comprising a second dome, the two domes having coincident axes of revolution.

* * * * *